United States Patent
Kim

(10) Patent No.: US 9,043,251 B2
(45) Date of Patent: May 26, 2015

(54) APPARATUS AND METHOD FOR RECOGNIZING REPRESENTATIVE USER BEHAVIOR BASED ON RECOGNITION OF UNIT BEHAVIORS

(71) Applicant: Samsung Electronics Co., Ltd., Suwon-si (KR)

(72) Inventor: Hyun-Jun Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 13/832,367

(22) Filed: Mar. 15, 2013

(65) Prior Publication Data

US 2014/0012785 A1    Jan. 9, 2014

(30) Foreign Application Priority Data

Jul. 6, 2012 (KR) .................. 10-2012-0074146

(51) Int. Cl.
*G06N 5/04* (2006.01)
*G06N 5/02* (2006.01)
*G06N 99/00* (2010.01)
*G06N 5/00* (2006.01)

(52) U.S. Cl.
CPC ........ *G06N 5/025* (2013.01); *G06N 5/00* (2013.01); *G06N 5/04* (2013.01); *G06N 99/005* (2013.01)

(58) Field of Classification Search
None
See application file for complete search history.

(56) References Cited

U.S. PATENT DOCUMENTS

2010/0075807 A1    3/2010    Hwang et al.
2011/0302169 A1    12/2011    Brdiczka et al.

FOREIGN PATENT DOCUMENTS

| KR | 10-0982164 B1 | 9/2010 |
| KR | 10-2010-0137963 A | 12/2010 |
| KR | 10-2012-0016300 A | 2/2012 |

OTHER PUBLICATIONS

Daniels, et al., Interactive Vector Field Feature Identification, IEEE Transactions on Visualization and Computer Graphics, 2010, pp. 1-9.*

* cited by examiner

*Primary Examiner* — Wilbert L Starks
(74) *Attorney, Agent, or Firm* — NSIP Law

(57) ABSTRACT

An apparatus for recognizing a representative user behavior includes a unit-data extracting unit configured to extract at least one unit data from sensor data, a feature-information extracting unit configured to extract feature information from each of the at least one unit data, a unit-behavior recognizing unit configured to recognize a respective unit behavior for each of the at least one unit data based on the feature information, and a representative-behavior recognizing unit configured to recognize at least one representative behavior based on the respective unit behavior recognized for each of the at least one unit data.

20 Claims, 5 Drawing Sheets

| SENSOR | DATA TO BE COLLECTED |
|---|---|
| ACCELERATION SENSOR | INFORMATION ABOUT USER'S MOVEMENTS (EX. WALKING, RUNNING, DRIVING CAR, SLEEPING, ETC.) |
| GPS | USER'S CURRENT LOCATION AND PATH |
| MICROPHONE | USER'S CURRENT STATE (EX. MANNER OF SPEECH, VOICE VOLUME, EMOTIONAL STATE, ETC.) |
| LIGHT SENSOR | SURROUNDING ENVIRONMENT INFORMATION (EX. INSIDE/OUTSIDE OR DAYTIME/NIGHTTIME) |
| CAMERA | USER'S CURRENT STATE (EX. FACIAL EXPRESSION, SURROUNDING ENVIRONMENT, ETC.) |
| PROXIMITY SENSOR | LOCATION OF USER DEVICE (EX. WHETHER USER IS ON PHONE OR CURRENTLY USING USER DEVICE) |
| TOUCH PANEL | USAGE STATE OF USER DEVICE (EX. WHAT KIND OF BEHAVIOR IS BEING PERFORMED) |
| SOFTWARE SENSOR SPACE (OS) | USER'S SOFTWARE USAGE HISTORY (EX. TELEPHONE, SMS, BUSINESS, GAME, NEWS, ETC.) |
| BIOSENSOR | BIOMETRIC INFORMATION (EX. BLOOD SUGAR LEVEL AND BLOOD PRESSURE) |

FIG. 2

| SENSOR | DATA TO BE COLLECTED |
|---|---|
| ACCELERATION SENSOR | INFORMATION ABOUT USER'S MOVEMENTS (EX. WALKING, RUNNING, DRIVING CAR, SLEEPING, ETC.) |
| GPS | USER'S CURRENT LOCATION AND PATH |
| MICROPHONE | USER'S CURRENT STATE (EX. MANNER OF SPEECH, VOICE VOLUME, EMOTIONAL STATE, ETC.) |
| LIGHT SENSOR | SURROUNDING ENVIRONMENT INFORMATION (EX. INSIDE/OUTSIDE OR DAYTIME/NIGHTTIME) |
| CAMERA | USER'S CURRENT STATE (EX. FACIAL EXPRESSION, SURROUNDING ENVIRONMENT, ETC.) |
| PROXIMITY SENSOR | LOCATION OF USER DEVICE (EX. WHETHER USER IS ON PHONE OR CURRENTLY USING USER DEVICE) |
| TOUCH PANEL | USAGE STATE OF USER DEVICE (EX. WHAT KIND OF BEHAVIOR IS BEING PERFORMED) |
| SOFTWARE SENSOR SPACE (OS) | USER'S SOFTWARE USAGE HISTORY (EX. TELEPHONE, SMS, BUSINESS, GAME, NEWS, ETC.) |
| BIOSENSOR | BIOMETRIC INFORMATION (EX. BLOOD SUGAR LEVEL AND BLOOD PRESSURE) |

APPARATUS AND METHOD FOR RECOGNIZING REPRESENTATIVE USER BEHAVIOR BASED ON RECOGNITION OF UNIT BEHAVIORS

CROSS-REFERENCE TO RELATED APPLICATIONS

This application claims the benefit under 35 USC 119(a) of Korean Patent Application No. 10-2012-0074146 filed on Jul. 6, 2012, the disclosure of which is incorporated herein by reference in its entirety for all purposes.

BACKGROUND

1. Field

This disclosure relates to an apparatus and a method for analyzing data measured using a sensor to recognize unit behaviors and recognizing a representative user behavior based on the recognized unit behaviors.

2. Description of Related Art

An increasing number of technologies have been introduced to recognize user's behaviors using various sensors. However, due to limitations of such recognition technologies, most products to which those technologies are applied are used simply to measure movement for the purpose of getting fit. In other words, the technologies for recognizing user' behaviors using a sensor are generally used for measuring movement of walking or running, but lack accuracy. Furthermore, it is more difficult to precisely recognize movement of daily life activities, such as having a meal, going to the toilet, and washing the face.

SUMMARY

In one general aspect, an apparatus for recognizing a representative user behavior includes a unit-data extracting unit configured to extract at least one unit data from sensor data; a feature-information extracting unit configured to extract feature information from each of the at least one unit data; a unit-behavior recognizing unit configured to recognize a respective unit behavior for each of the at least one unit data based on the feature information; and a representative-behavior recognizing unit configured to recognize at least one representative behavior based on the respective unit behavior recognized for each of the at least one unit data.

The unit-data extracting unit may be further configured to divide the sensor data into unit data having a predetermined time length or a predetermined data size to extract the at least one unit data.

The unit-data extracting unit may be further configured to extract at least one time-domain unit data from the sensor data, and convert the at least one time-domain unit data into at least one frequency-domain unit data; and the feature information extracting unit may be further configured to extract the feature information from the at least one frequency-domain unit data.

The feature information may include any one or any combination of a mean, entropy, energy, and a correlation.

The sensor data may include sensor data collected from any one or any combination of an acceleration sensor, a gyroscope, a Global Positioning System (GPS), a microphone, a light sensor, a camera, a proximity sensor, a touch panel, a software sensor, and a biosensor.

The unit-behavior recognizing unit may be further configured to classify the feature information into the respective unit behavior recognized for each of the at least one unit data using a predetermined learning algorithm learned from learning data.

The predetermined learning algorithm may be any one of a Bayesian learning algorithm, a Support Vector Machine (SVM) learning algorithm, and a Decision Tree learning algorithm.

The apparatus may further include an update unit configured to update the learning data based on the respective unit behavior recognized for each of the at least one unit data, or the at least one representative behavior, or the respective unit behavior recognized for each of the at least one unit data and the at least one representative behavior.

The representative-behavior recognizing unit may be further configured to classify the respective unit behavior recognized for each of the unit data into the at least one representative behavior using any one of a Bayesian learning algorithm, a Support Vector Machine (SVM) learning algorithm, a Decision Tree learning algorithm, a Hidden Markov Model (HMM) learning algorithm, and a Finite-State Machine (FSM) learning algorithm.

The representative-behavior recognizing unit may be further configured to select at least one unit behavior from the respective unit behavior recognized for each of the at least one unit data based on a predetermined criterion, and classify a representative behavior of the selected at least one unit behavior as a representative user behavior.

The apparatus may further include a display unit configured to display the at least one representative behavior with the sensor data on a time axis of the sensor data.

In another general aspect, a method of recognizing a representative user behavior includes extracting at least one unit data from sensor data; extracting feature information from each of the at least one unit data; recognizing a respective unit behavior for each of the at least one unit data based on the feature information; and recognizing at least one representative behavior based on the respective unit behavior recognized for each of the at least one unit data.

The extracting may include dividing the sensor data into unit data have a predetermined time length or a predetermined data size to extract the at least one unit data.

The feature information may include any one or any combination of a mean, entropy, energy, and a correlation.

The sensor data may include sensor data collected from any one or any combination of an acceleration sensor, a gyroscope, a GPS, a microphone, a light sensor, a camera, a proximity sensor, a touch panel, a software sensor, and a biosensor.

The recognizing of a respective unit behavior for each of the at least one unit data may include classifying the feature information into the respective unit behavior recognized for each of the at least one unit data using a predetermined learning algorithm learned from learning data.

The predetermined learning algorithm may be any one of a Bayesian learning algorithm, a Support Vector Machine (SVM) learning algorithm, and a Decision Tree learning algorithm.

The method may further include updating the learning data based on the respective unit behavior recognized for each of at least one unit data, or the at least one representative behavior, or the respective unit behavior recognized for each of the at least one unit data and the at least one representative behavior.

The recognizing of the at least one representative behavior may include classifying the respective unit behavior recognized for each of the unit data into the at least one representative behavior using any one of a Bayesian learning algorithm, a Support Vector Machine (SVM) learning algorithm, a Decision Tree learning algorithm, a Hidden Markov Model (HMM) learning algorithm, and a Finite-State Machine (FSM) learning algorithm.

The recognizing of the at least one representative behavior may include selecting at least one unit behavior from the respective unit behavior recognized for each of the at least one unit data based on a predetermined criterion; and classifying a representative behavior of the selected at least one unit behavior as a representative user behavior.

Other features and aspects will be apparent from the following detailed description, the drawings, and the claims.

BRIEF DESCRIPTION OF THE DRAWINGS

FIG. 2 is a table illustrating an example of sensor data that may be collected.

DETAILED DESCRIPTION

Figure 1:
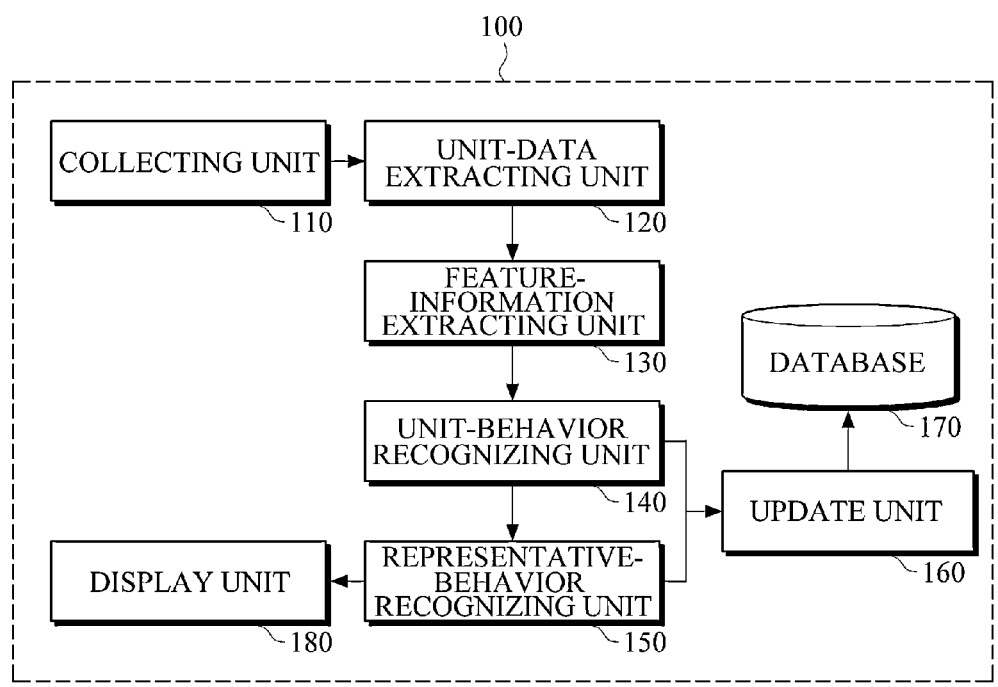
FIG. 1 is a block diagram illustrating an example of an apparatus for recognizing a representative user behavior based on unit-behavior recognition.

The following detailed description is provided to assist the reader in gaining a comprehensive understanding of the methods, apparatuses and/or systems described herein. However, various changes, modifications, and equivalents of the methods, apparatuses, and/or systems described herein will be apparent to one of ordinary skill in the art. Also, descriptions of functions and structures that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 3:
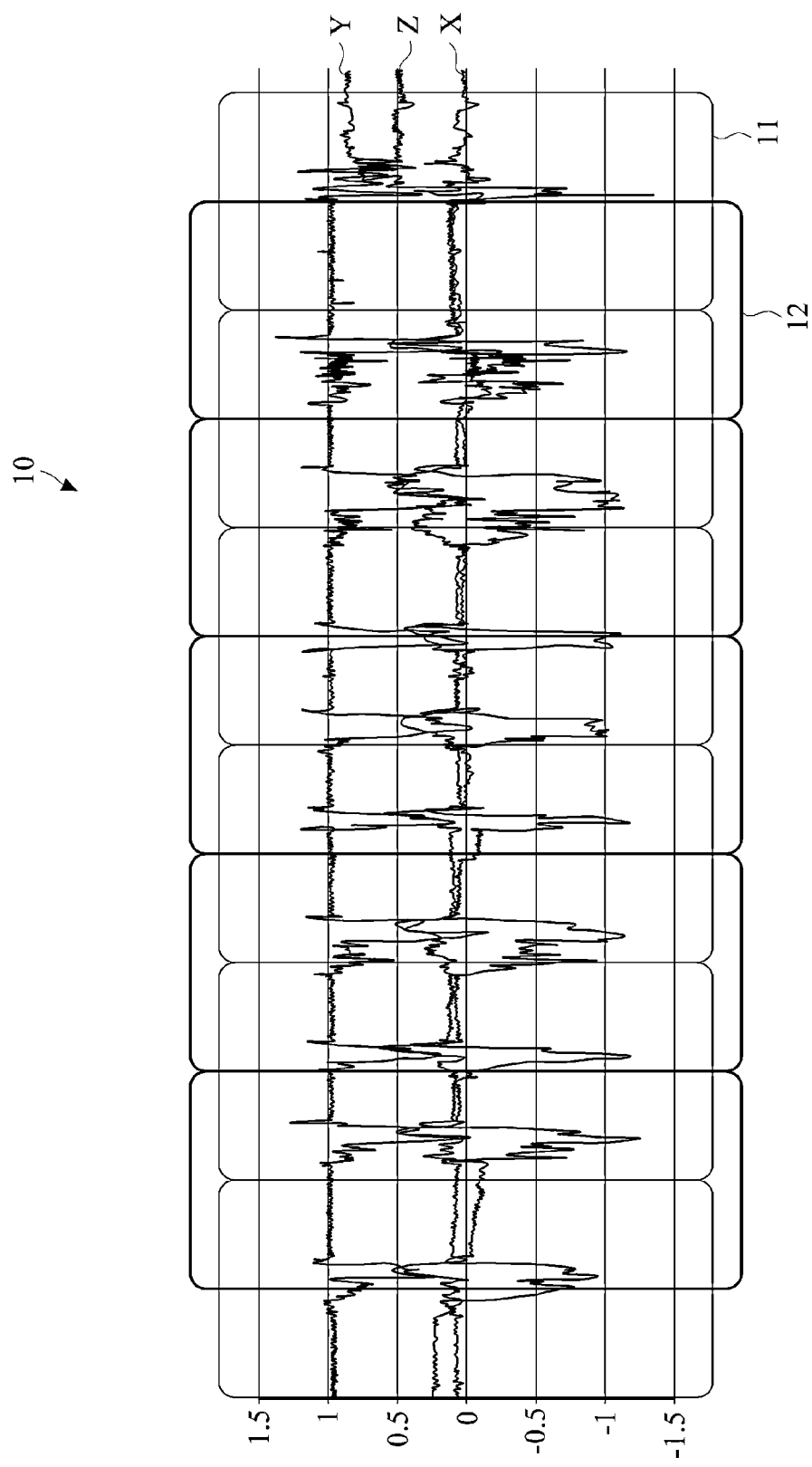
FIG. 3 is a diagram illustrating an example of extracting unit data from sensor data.
Figure 4:
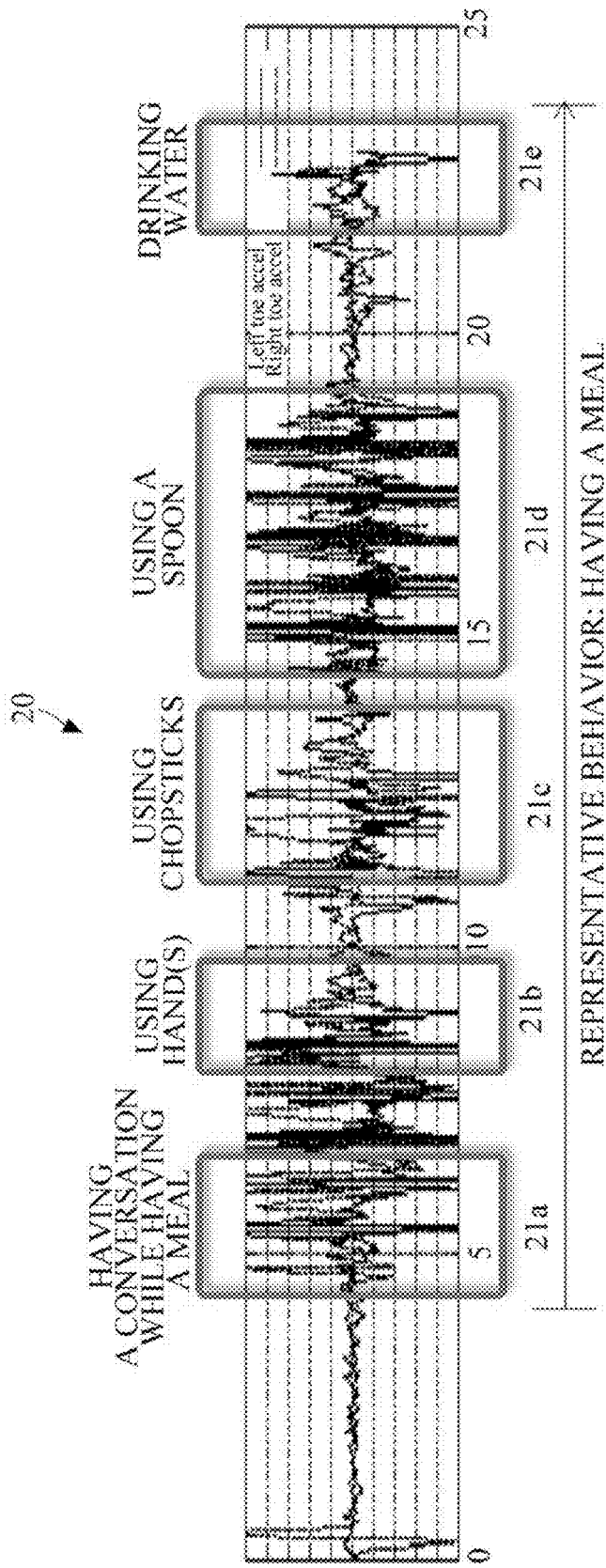
FIG. 4 is a diagram illustrating an example of displaying a recognized representative behavior with sensor data on a time axis of the sensor data.

FIG. 1 is a block diagram illustrating an example of an apparatus for recognizing a representative user behavior based on unit-behavior recognition. FIG. 2 is a table illustrating an example of sensor data that may be collected. FIG. 3 is a diagram illustrating an example of extracting unit data from sensor data. FIG. 4 is a diagram illustrating an example of displaying a recognized representative behavior with sensor data on a time axis of the sensor data.

Referring to FIG. 1, the apparatus 100 for recognizing a representative user behavior includes a unit-data extracting unit 120, a feature-information extracting unit 130, a unit-behavior recognizing unit 140, and a representative-behavior recognizing unit 150.

The unit-data extracting unit 120 extracts at least one unit data from sensor data. The unit-data extracting unit 120 may divide the sensor data into unit data having a predetermined time length (for example, one second) or a predetermined data size (for example, one byte) to extract the at least one unit data.

A sensor may be a sensor embedded in the apparatus 100, or an external sensor connected wirelessly or by wires to the apparatus 100 to transmit and receive data. For example, as shown in FIG. 2, the sensor may be an acceleration sensor, a GPS, a microphone, a light sensor, a camera, a proximity sensor, a touch panel, a software sensor, and a biosensor, but is not limited thereto.

The apparatus 100 may further include a collecting unit 110 configured to collect sensor data from various sensors.

As shown in FIG. 2, the collecting unit 110 may collect various data from various sensors, such as information about a user's movements, such as walking, running, driving a car, and sleeping, from an acceleration sensor; information about a user's current location and path from a GPS; information about a user's current state, such as a manner of speech, a voice volume, and an emotional state, from a microphone; information about a user's surrounding environment, such as inside/outside or daytime/nighttime, from a light sensor; information about a user's current state, such as a facial expression and a surrounding environment, from a camera; information about a location of a user device, such as whether a user is on a phone or currently using a user device, from a proximity sensor; information about a usage state of a user device, such as what kind of behavior is being performed, from a touch panel; information about a user's software usage history, such as telephone, short message service (SMS), business, game, and news, from a software sensor, which may be a function provided by an operating system (OS); and biometric information, such as a blood sugar level and a blood pressure, from a biosensor.

FIG. 3 is a diagram illustrating an example of extracting unit data 11 and 12 from sensor data 10 collected through an acceleration sensor. Referring to FIGS. 1 and 3, the unit-data extracting unit 120 first extracts six unit data 11 by dividing the continuous sensor data 10 into unit data having a predetermined time length (for example, one second). Next, the unit-data extracting unit 120 extracts five unit data 12 by dividing the sensor data 10 into unit data having the predetermined time length so that each of the unit data 12 overlaps two of the unit data 11, so that a total of eleven unit data are extracted. The purpose of this process is to prevent an ambiguous pattern or a loss of some of the sensor data 10 that might occur if the continuous sensor data 10 were simply divided into a single sequence of consecutive unit data, thereby making it possible to recognize unit behaviors clearly and precisely.

The feature-information extracting unit 130 extracts feature information from each of the extracted unit data 11 and 12. The feature information may include any one or any combination of a mean, entropy, energy, and a correlation.

For example, as shown in FIG. 3, as the sensor data 10 is collected through the acceleration sensor for each of X, Y, and Z axes, feature information including a mean, entropy, energy, an X-Y correlation, a Y-Z correlation, and an X-Z correlation (X-Z) may be extracted from each of the eleven unit data 11 and 12 that are extracted from the sensor data 10 for each of the X, Y, and Z axes.

The sensor data 10 is collected in a time domain along a time axis, and thus the unit data 11 and 12 extracted from the sensor data 10 are time-domain unit data 11 and 12. The unit-data extracting unit 120 converts the time-domain unit data 11 and 12 into frequency-domain unit data. The feature-information extracting unit 130 extracts the feature information from the frequency-domain unit data. The unit-data extracting unit 120 may convert the time-domain unit data into the frequency-domain unit data using a Fast Fourier Transformation (FFT) algorithm, or any other suitable algorithm known to one of ordinary skill in the art.

The unit-behavior recognizing unit 140 recognizes a unit behavior for each of the unit data 11 and 12 based on the feature information extracted from each of the unit data 11 and 12. A unit behavior is a detailed behavior of a representative behavior performed by a user for a predetermined time period. If a representative behavior is 'having a meal', unit behaviors of 'having a meal' may be 'sitting', 'picking up a spoon', 'putting food onto the spoon', 'picking up chopsticks', 'picking up side dishes using chopsticks', 'putting the side dishes into the mouth', 'drinking water', 'putting down the spoon', and 'arranging the chopsticks'.

The unit-behavior recognizing unit 140 recognizes the unit behavior by classifying the extracted feature information as the unit behavior using a predetermined learning algorithm learned from learning data. The learning data is data for learning unit behaviors that has been previously learned, and may be updated based on the recognized unit behavior. The predetermined learning algorithm may be any one of a Bayesian learning algorithm, an SVM learning algorithm, and a Decision Tree learning algorithm, but is not limited thereto.

The representative-behavior recognizing unit 150 recognizes at least one representative behavior based on the recognized unit behaviors of the unit data 11 and 12. A user may perform two or more representative behaviors for a long time period, so that if the collected sensor data 10 is collected over the long time period, two or more representative behaviors may be recognized from the sensor data 10. In addition, the representative-behavior recognizing unit 150 may recognize a representative user behavior using various techniques.

For example, as shown in FIG. 3, if recognized unit behaviors of eleven unit data 11 and 12 are 'picking up a spoon', 'putting food onto the spoon', 'putting the food into the mouth', 'putting down the spoon', 'picking up chopsticks', 'picking up side dishes' putting the side dishes into the mouth', 'putting down the chopsticks', 'picking up the spoon', 'putting soup onto the spoon', and 'putting the soup into the mouth', a learning algorithm learned from previously-learned learning data is used to perform a classification process to recognize a representative behavior in the same way that a unit behavior is recognized, and 'having a meal' is recognized as a representative behavior.

In another example, if a representative behavior has significance only when unit behaviors are performed in a sequence, a learning algorithm that recognizes sequences, such as a Hidden Markov Model (HMM) learning algorithm or a Finite-State Machine (FSM) learning algorithm, may be used. If unit behaviors of 'having a meal' are performed in a sequence, 'having a meal' may be recognized as a representative behavior, but in fact, 'having a meal' has significance on its own, regardless of a sequence of the unit behaviors.

In addition, if a sequence of unit behaviors does not have any significance as a representative behavior, it is possible to select at least one unit behavior from the unit behaviors of the sequence based on a predetermined criterion, and recognize a representative behavior of the selected at least one unit behavior as a representative user behavior. For example, a unit behavior having a greatest frequency of occurrence may be selected from the sequence of unit behaviors, and a representative behavior of the selected unit behaviors may be recognized as a representative user behavior. In the above example of 'having a meal', the unit behavior that has the greatest frequency of occurrence is 'putting the food into the mouth', 'putting the side dishes into the mouth', and 'putting the soup into the mouth'. A representative behavior of these three unit behaviors is 'putting food into the mouth', and the representative behavior of 'putting food into the mouth' may be recognized as a representative user behavior.

The apparatus 100 may further include an update unit 160 and a database 170.

The update unit 160 updates the learning data based on the recognized unit behaviors, the recognized representative behavior, or both the recognized unit behaviors and the recognized representative behavior. The learning data is stored in the database 170. The update unit 160 may determine in advance whether the recognized behaviors are worth being learned, and then determine whether to update the learning data based on the recognized unit behaviors and/or the recognized representative behavior based on a result of the determination, thereby enhancing a quality of the learning data.

For example, the update unit 160 may request a learning-value determination module to determine whether the recognized representative behavior and/or the recognized unit behaviors are worth being learned, and then the update unit 160 may receive a result of the determination from the learning-value determination module and determine whether to update the learning data based on the recognized representative behavior and/or the recognized unit behaviors based on the result. In one example, the learning-value determination module may be installed in the apparatus 100 for recognizing a representative user behavior. In another example, the learning-value determination module may be installed in an external system separate from the apparatus 100 for recognizing a representative user behavior.

Alternatively, if a representative behavior or a unit behavior is recognized, the update unit 160 may ask a user whether the user would like to update the learning data based on the representative behavior or the unit behavior by asking the user a question, such as 'Would you like to update the learning data based on this behavior?', and the update unit 160 may determine whether to update the learning data based on the representative behavior and/or the unit behavior based on the user's answer.

In addition, if a unit behavior (for example, a sub-behavior of having a meal) is recognized, the update unit 160 may provide the unit behavior to a user, ask the user to provide a precise representative behavior (for example, 'having a meal') of the unit behavior, receive the precise representative behavior from the user, and then update the learning data based on the precise representative behavior received from the user. In addition, the update unit 160 may provide a unit behavior and a representative behavior to a user simultaneously, ask the user whether the representative behavior is subject to the unit behavior, and then update the learning data based on an answer received from the user.

The database 170 may store sensor data collected by the collecting unit 110. In addition, the database 170 may store reference information including a reference unit used by the unit-data extracting unit 120 to divide the sensor data into unit data, such as a predetermined time length (for example, one second) or a predetermined data size (for example, one byte), feature information to be extracted by the feature-information extracting unit 130, and a learning algorithm to be used by the unit-behavior recognizing unit 140 and/or the representative-behavior recognizing unit 150.

According to the above-described examples, a representative user behavior may be precisely recognized through a two-step recognition process in which sensor data is analyzed using a learning algorithm learned from learning data in order to recognize precise unit behaviors, and then such precisely recognized unit behaviors are analyzed using various techniques in order to recognize a representative user behavior.

The apparatus 100 may further include a display unit 180.

Referring to FIG. 4, the display unit 180 may display a recognized representative behavior ('having a meal') with the sensor data 20 on a time axis of the sensor data 20 for viewing by a user. For example, if recognized unit behaviors of five unit data 21*a*, 21*b*, 21*c*, 21*d*, and 21*e* are 'having a conversation while having a meal', 'using hand(s)', 'using chopsticks', 'using a spoon', and 'drinking water', respectively, the unit behaviors and a representative behavior of the unit behaviors, or 'having a meal', are displayed with the sensor data 20 on a time axis of the sensor data 20 for viewing by the user.

Unit behaviors and a representative behavior that are recognized as described above may be used in an important and valuable way in automobile, medical, and other various industries. For example, in the automobile industry, if a representative behavior of 'dozing off while driving' is recognized based on a sequence of recognized unit behaviors, an alert system may send a signal or a message to a driver. In the medical industry, a representative behavior of a patient is monitored taking into consideration a disease from which the patient is suffering, and if an abnormal behavior of the patient is recognized, the patient may be treated appropriately in a timely manner, including adjusting meal intervals and a required amount of activity for a diabetic.

Figure 5:
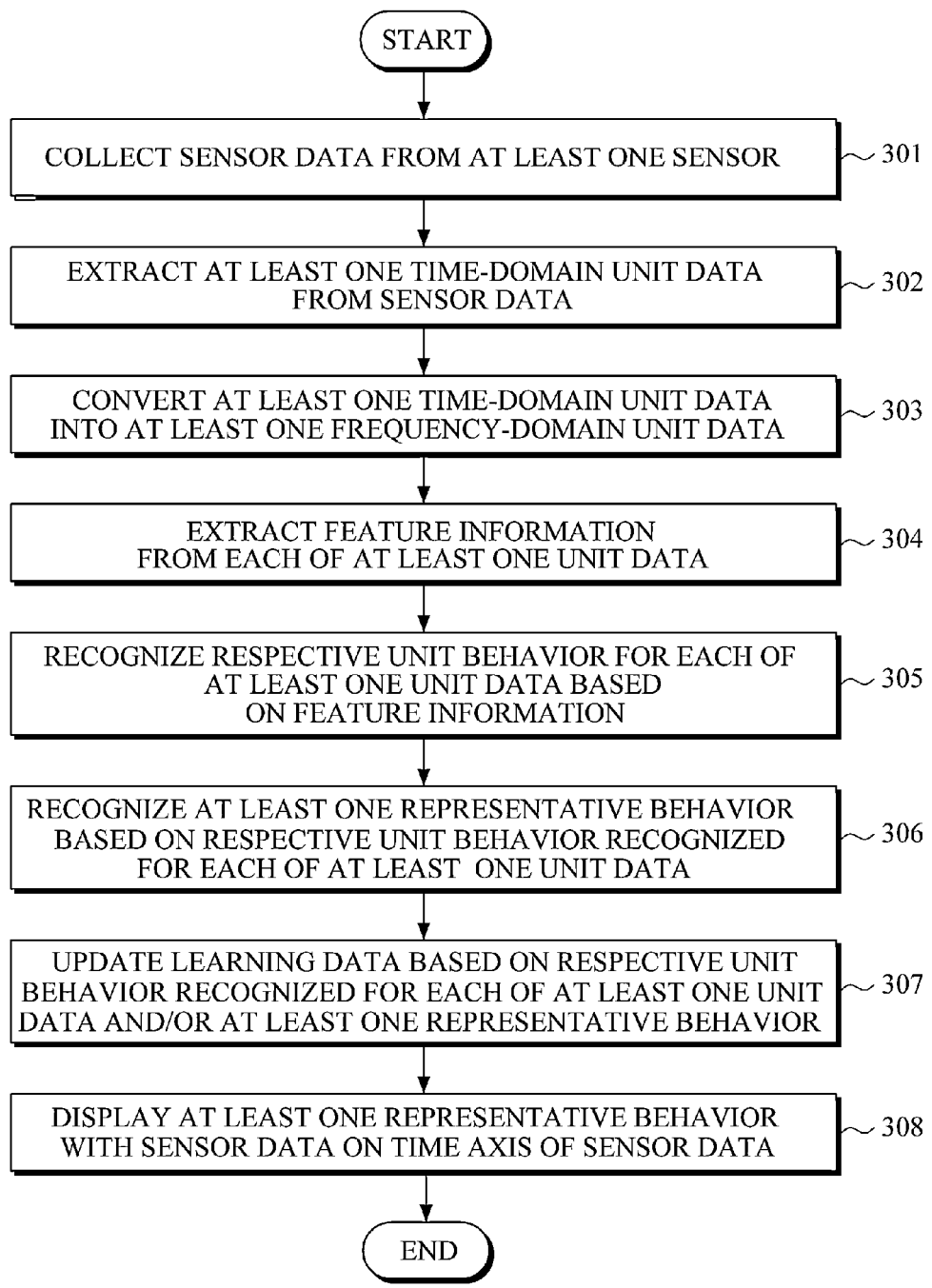
FIG. 5 is a flow chart illustrating an example of a method of recognizing a representative user behavior based on unit-behavior recognition.

FIG. 5 is a flow chart illustrating an example of a method of recognizing a representative user behavior based on unit-behavior recognition. Referring to FIG. 5, the method of recognizing a representative user behavior will be described with reference to the apparatus 100 for recognizing a representative user behavior shown in FIG. 1.

To start with, the apparatus 100 collects sensor data from at least one sensor in 301. The sensor data may be data collected from a sensor embedded in the apparatus, or from an external sensor connected wirelessly or by wires to the apparatus 100, such as an acceleration sensor, a GPS, a microphone, a light sensor, a camera, a proximity sensor, a touch panel, a software sensor, and a biosensor.

Next, at least one unit data is extracted from the collected sensor data in 302. As described above with reference to FIG. 3, the sensor data 10 is divided into unit data having a predetermined time length (for example, one second) to extract the six unit data 11 and the five unit data 12. Since an ambiguous pattern or a loss of some of the sensor data 10 might occur if the continuous sensor data 10 were simply divided into a single sequence of consecutive unit data, the six unit data 11 are extracted first by dividing the continuous sensor data 10 into unit data having the predetermined time length, and then the five unit data 12 are extracted by dividing the continuous sensor data 10 into unit data have the predetermined time length so that each of unit data 12 overlaps two of the unit data 11.

Next, the extracted unit data 11 and 12, which is time-domain unit data, is converted into frequency-domain unit data in 303. Converting the time-domain unit data into the frequency-domain unit makes it possible to analyze a smaller amount of data easily at a lower cost.

Next, feature information is extracted from each of the frequency-domain unit data in 304. The extracted feature information may include any one or any combination of a mean, entropy, energy, and a correlation. The extracted feature information is extracted for each of the sensors, if there are two or more sensors, it is possible to extract feature information including a mean, entropy, and energy for each of the sensors and a correlation between the sensors.

Next, a unit behavior is recognized for each of the unit data based on the extracted feature information in 305. The extracted feature information from each of the unit data is classified using a learning algorithm learned from learning data to recognize a unit behavior for each of the unit data. The learning algorithm may be any one of a Bayesian learning algorithm, a Support Vector Machine (SVM) learning algorithm, and a Decision Tree learning algorithm, but is not limited thereto.

Next, at least one representative behavior representing the recognized unit behaviors is recognized based on the recognized unit behaviors in 306. As described above, the recognized unit behaviors are analyzed using various techniques in order to recognize a representative behavior.

For example, a representative behavior may be recognized using a learning algorithm learned from previously-learned learning data in the same way as described above. In another example, if a representative behavior has significance only when unit behaviors are performed in a sequence, a learning algorithm that recognizes sequences, such as a Hidden Markov Model (HMM) learning algorithm or a Finite-State Machine (FSM) learning algorithm, may be used.

In another example, if a sequence of unit behaviors does not have any significance as a representative behavior, at least one unit behavior is selected from the unit behaviors of the sequence based on a predetermined criterion, such as a greatest frequency of occurrence, and a representative behavior of the selected at least one unit behavior recognized as a representative user behavior.

If the unit behaviors are recognized or the representative behavior is recognized, the learning data is updated based on the unit behaviors and/or the representative behavior in 307. It is possible to determine in advance whether to update the learning data based on the recognized representative behavior and/or the recognized unit behaviors, and to update the learning data based on the recognized representative behavior and/or the recognized unit behaviors according to a result of the determination. As described above, if unit behaviors are recognized or a representative behavior is recognized, the update unit 160 may request a learning-value determination module to determine whether the recognized behaviors are worth being learned, or may ask a user whether the recognized behaviors are worth being learned, and the update unit 160 may determine whether to update the learning data based on the unit behaviors and/or the representative behavior based on the result of the determination by the learning-value determination module or the user's answer.

The recognized representative behavior is displayed with the sensor data on a time axis of the sensor data for viewing by the user in 308. The user may use the displayed information in automobile, medical, and other industries.

The apparatus 100 for recognizing a representative user behavior, the collecting unit 110, the unit-data extracting unit 120, the feature-information extracting unit 130, the unit-behavior recognizing unit 140, the representative-behavior recognizing unit 150, the update unit 160, the database 170, the display unit 180, and the learning-value determination module described above may be implemented using one or more hardware components, one or more software components, or a combination of one or more hardware components and one or more software components.

A hardware component may be, for example, a physical device that physically performs one or more operations, but is not limited thereto. Examples of hardware components include sensors, amplifiers, differential amplifiers, operational amplifiers, comparators, analog-to digital converters, digital-to-analog converters, low-pass filters, high-pass filters, band-pass filters, arithmetic elements, operational elements, functional elements, registers, buses, memory devices, and processing devices.

A software component may be implemented, for example, by a processing device controlled by software or instructions to perform one or more operations, but is not limited thereto.

A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for recognizing a representative user behavior, the apparatus comprising:
  a unit-data extracting unit configured to extract at least one unit data from sensor data;
  a feature-information extracting unit configured to extract feature information from each of the at least one unit data;
  a unit-behavior recognizing unit configured to recognize a respective unit behavior for each of the at least one unit data based on the feature information; and
  a representative-behavior recognizing unit configured to recognize at least one representative behavior based on the respective unit behavior recognized for each of the at least one unit data.

2. The apparatus of claim 1, wherein the unit-data extracting unit is further configured to divide the sensor data into unit data having a predetermined time length or a predetermined data size to extract the at least one unit data.

3. The apparatus of claim 1, wherein the unit-data extracting unit is further configured to extract at least one time-domain unit data from the sensor data, and convert the at least one time-domain unit data into at least one frequency-domain unit data; and
the feature information extracting unit is further configured to extract the feature information from the at least one frequency-domain unit data.

4. The apparatus of claim 1, wherein the feature information comprises any one or any combination of a mean, entropy, energy, and a correlation.

5. The apparatus of claim 1, wherein the sensor data comprises sensor data collected from any one or any combination of an acceleration sensor, a gyroscope, a Global Positioning System (GPS), a microphone, a light sensor, a camera, a proximity sensor, a touch panel, a software sensor, and a biosensor.

6. The apparatus of claim 1, wherein the unit-behavior recognizing unit is further configured to classify the feature information into the respective unit behavior recognized for each of the at least one unit data using a predetermined learning algorithm learned from learning data.

7. The apparatus of claim 6, wherein the predetermined learning algorithm is any one of a Bayesian learning algorithm, a Support Vector Machine (SVM) learning algorithm, and a Decision Tree learning algorithm.

8. The apparatus of claim 6, further comprising an update unit configured to update the learning data based on the respective unit behavior recognized for each of the at least one unit data, or the at least one representative behavior, or the respective unit behavior recognized for each of the at least one unit data and the at least one representative behavior.

9. The apparatus of claim 1, wherein the representative-behavior recognizing unit is further configured to classify the respective unit behavior recognized for each of the unit data into the at least one representative behavior using any one of a Bayesian learning algorithm, a Support Vector Machine (SVM) learning algorithm, a Decision Tree learning algorithm, a Hidden Markov Model (HMM) learning algorithm, and a Finite-State Machine (FSM) learning algorithm.

10. The apparatus of claim 1, wherein the representative-behavior recognizing unit is further configured to select at least one unit behavior from the respective unit behavior recognized for each of the at least one unit data based on a predetermined criterion, and classify a representative behavior of the selected at least one unit behavior as a representative user behavior.

11. The apparatus of claim 1, further comprising a display unit configured to display the at least one representative behavior with the sensor data on a time axis of the sensor data.

12. A method of recognizing a representative user behavior, the method comprising:
extracting at least one unit data from sensor data;
extracting feature information from each of the at least one unit data;
recognizing a respective unit behavior for each of the at least one unit data based on the feature information; and
recognizing at least one representative behavior based on the respective unit behavior recognized for each of the at least one unit data.

13. The method of claim 12, wherein the extracting comprises dividing the sensor data into unit data have a predetermined time length or a predetermined data size to extract the at least one unit data.

14. The method of claim 12, wherein the feature information comprises any one or any combination of a mean, entropy, energy, and a correlation.

15. The method of claim 12, wherein the sensor data comprises sensor data collected from any one or any combination of an acceleration sensor, a gyroscope, a GPS, a microphone, a light sensor, a camera, a proximity sensor, a touch panel, a software sensor, and a biosensor.

16. The method of claim 12, wherein the recognizing of a respective unit behavior for each of the at least one unit data comprises classifying the feature information into the respective unit behavior recognized for each of the at least one unit data using a predetermined learning algorithm learned from learning data.

17. The method of claim 16, wherein the predetermined learning algorithm is any one of a Bayesian learning algorithm, a Support Vector Machine (SVM) learning algorithm, and a Decision Tree learning algorithm.

18. The method of claim 16, further comprising updating the learning data based on the respective unit behavior recognized for each of at least one unit data, or the at least one representative behavior, or the respective unit behavior recognized for each of the at least one unit data and the at least one representative behavior.

19. The method of claim 12, wherein the recognizing of the at least one representative behavior comprises classifying the respective unit behavior recognized for each of the unit data into the at least one representative behavior using any one of a Bayesian learning algorithm, a Support Vector Machine (SVM) learning algorithm, a Decision Tree learning algorithm, a Hidden Markov Model (HMM) learning algorithm, and a Finite-State Machine (FSM) learning algorithm.

20. The method of claim 12, wherein the recognizing of the at least one representative behavior comprises:
selecting at least one unit behavior from the respective unit behavior recognized for each of the at least one unit data based on a predetermined criterion; and
classifying a representative behavior of the selected at least one unit behavior as a representative user behavior.

* * * * *